United States Patent [19]
Waldow

[11] 3,858,864
[45] Jan. 7, 1975

[54] VEHICLE DOOR SUPPORTING APPARATUS

[75] Inventor: Carl E. Waldow, Sanford, Fla.

[73] Assignee: The Raymond Lee Organization, New York, N.Y. ; a part interest

[22] Filed: Mar. 7, 1973

[21] Appl. No.: 338,675

[52] U.S. Cl............... 269/17, 269/59, 269/76, 269/152
[51] Int. Cl............................................ B25b 11/00
[58] Field of Search.......... 29/200 J, 200 P; 269/45, 269/55, 58, 59, 76, 74, 140, 141, 152, 17

[56] References Cited
UNITED STATES PATENTS

| | | | |
|---|---|---|---|
| 2,679,684 | 6/1954 | Fagan | 269/76 X |
| 2,803,872 | 8/1957 | Massa | 269/76 X |
| 2,879,059 | 3/1959 | Sandefur | 269/76 X |
| 3,317,205 | 5/1967 | Kerr | 269/76 |

Primary Examiner—Roy Lake
Assistant Examiner—Mark S. Bicks
Attorney, Agent, or Firm—Daniel Jay Tick

[57] ABSTRACT

Door supporting apparatus for supporting a door of a vehicle in a desired position comprises a movable dolly base. An angular member is rotatably mounted on the base in a manner whereby it is at substantially right angles to the base in one position and substantially parallel to the base in another position. A pair of spaced substantially parallel arms are movably mounted on the angular member in a manner whereby the arms are spaced a desired distance from each other and are substantially parallel to the base in the one position of the angular member and at substantially right angles to the base in the other position of the angular member. Clamps at the free ends of the arms hold the door of a vehicle on the inside or the outside to permit removal of the door from the vehicle, work on the door and remounting of the door on the vehicle.

4 Claims, 3 Drawing Figures

VEHICLE DOOR SUPPORTING APPARATUS

DESCRIPTION OF THE INVENTION

The present invention relates to vehicle door supporting apparatus.

The principal object of the invention is to provide vehicle door supporting apparatus of simple structure for supporting a door of a vehicle in a desired position with convenience, facility, ease, efficiency, effectiveness and reliability, to permit removal of the door from the vehicle, work on the door and remounting of the door on the vehicle.

In order that the invention may be readily carried into effect, it will now be described with reference to the accompanying drawing, wherein.

In the FIGS., ths same components are identified by the same reference numerals.

Figure 1:
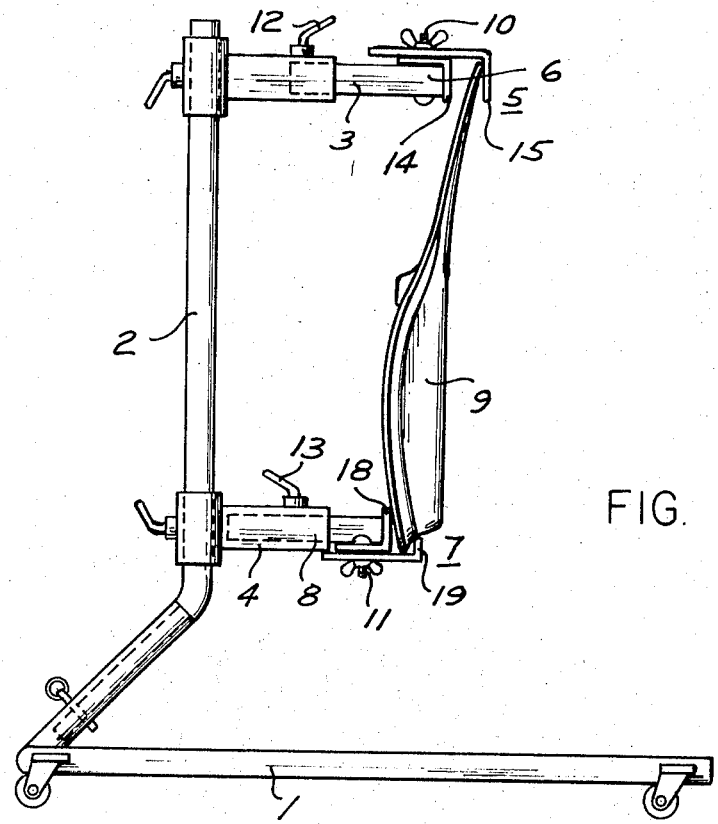
FIG. 1 is a schematic diagram of an embodiment of the door supporting apparatus of the invention in one position.
Figure 2:
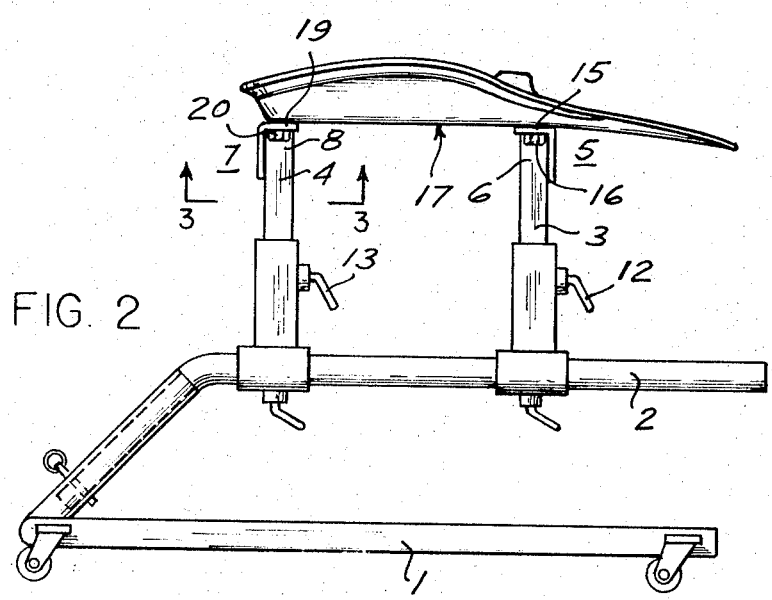
FIG. 2 is a schematic diagram of the embodiment of FIG. 1 in another position.

The door supporting apparatus of the invention supports a door of a vehicle in a desired position. The apparatus comprises a movable dolly base 1 (FIGS. 1 and 2). A base support member 1a (FIGS. 1 and 2) comprises a substantially tubular member affixed by any suitable means such as, for example, welding, to the base 1 and extending at an angle with the base. An angular member 2 (FIGS. 1 and 2) is rotatably mounted on the base 1 in a manner whereby it is at substantially right angles to the base in one position, shown in FIG. 1, and substantially parallel to the base in another position, shown in FIG. 2.

A pair of spaced substantially parallel arms 3 and 4 (FIGS. 1 and 2) are movably mounted on the angular member 2 in a manner whereby the arms are spaced a desired distance from each other and are substantially parallel to the base 1 in the one position of the angular member 2, as shown in FIG. 1, and at substantially right angles to the base in the other position of the angular member, as shown in FIG. 2. The arms 3 and 4 are movably affixed to the member 2 via sleeves 3a and 4a, respectively, coaxially movably mounted on said member.

A clamp 5 is provided at the free end 6 of the arm 3 and a clamp 7 is provided at the free end 8 of the arm 4 for holding the door 9 (FIGS. 1, 2 and 3) of a vehicle on the inside, as shown in FIG. 2, or the outside, as shown in FIG. 1, to permit removal of the door from the vehicle, work on the door and mounting of the door. The clamps 5 and 7 are adjustable in directions along the arms 3 and 4 via bolts and wing nuts 10 and 11, respectively, and clamp levers 12 and 13, respectively, to accommodate different parts of a door 9.

The clamp 5 has a fixed abutting member 14 at the free end 6 of the arm 3 and a movably mounted abutting member 15 mounted on said arm in a manner whereby the abutting members are spaced a desired distance from each other (FIG. 1). The movably mounted abutting member 15 has a plurality of spaced bores formed therethrough (not shown in the FIGS.) to accommodate metal screws 16 (FIGS. 2 and 3) for affixing the abutting member to the inside 17 of the door 9 of the vehicle (FIG. 2).

Figure 3:
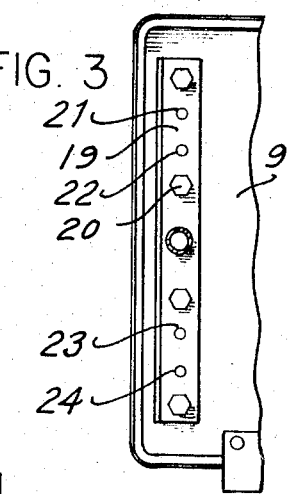
FIG. 3 is a view, taken along the lines 3—3, of FIG. 2.

The clamp 7 has a fixed abutting member 18 at the free end 8 of the arm 4 and a movably mounted abutting member 19 mounted on said arm in a manner whereby the abutting members are spaced a desired distance from each other (FIG. 1). The movably mounted abutting member 19 has a plurality of bores 21, 22, 23, 24, and so on (FIG. 3), formed therethrough to accommodate metal screws 20 (FIGS. 2 and 3) for affixing the abutting member to the inside 17 of the door 9 of the vehicle (FIGS. 2 and 3).

The apparatus of the invention clamps the door 9 and holds it vertically, as shown in FIG. 1, to permit inside work to be done on the door. The apparatus of the invention is threadedy coupled to the door 9 and holds it horizontally, as shown in FIG. 2, to permit outside work to be done on the door.

I claim:

1. Door supporting apparatus for supporting a door of a vehicle in a desired position, said apparatus comprising
   a movably dolly base;
   a base support member comprising a substantially tubular member affixed to the base and extending at an angle with the base;
   an angular member rotatably mounted in the base support member on the base in a manner whereby it is at substantially right angles to the base in one position and substantially parallel to the base in another position;
   a pair of spaced substantially parallel arms movably independently mounted on the angular member in a manner whereby the arms are selectively spaced a desired distance from each other and are substantially parallel to the base in the one position of the angular member and at substantially right angles to the base in the other position of the angular member; and
   clamping means at the free ends of the arms for holding the door of a vehicle on the inside or the outside to permit removal of the door from the vehicle, work on the door and remounting of the door on the vehicle.

2. Door supporting apparatus as claimed in claim 1, wherein the clamping means are adjustable in directions along the arms to accommodate different parts of a door.

3. Door supporting apparatus as claimed in claim 2, wherein each of the clamping means has a fixed abutting member at the free end of the corresponding one of the arms and a movably mounted abutting member mounted on the arm in a manner whereby the abutting members of each of the clamping members are spaced a desired distance from each other.

4. Door supporting apparatus as claimed in claim 3, wherein the movably mounted abutting member of each of the clamping means has a plurality of spaced bores formed therethrough to accommodate metal screws for affixing the abutting member to the inside of the door of the vehicle.

* * * * *